United States Patent Office 3,585,682
Patented June 22, 1971

3,585,682
BLOW-MOLDING APPARATUS FOR MOLDING HOLLOW PLASTIC ARTICLES
Nerio Martelli, Bologna, Italy, assignor to Solvay & Cie, Brussels, Belgium
Filed Nov. 19, 1968, Ser. No. 776,968
Claims priority, application Belgium, Nov. 22, 1967, 51,168
Int. Cl. B29d 23/03
U.S. Cl. 18—5                                     14 Claims

ABSTRACT OF THE DISCLOSURE

Rotary blow-molding apparatus in which a plurality of molds are disposed in an arrangement in which they are moved along a closed path at constant speed and during their travel each receive a section of a parison continuously extruded in timed relationship with the travel of the continuously traveling molds. The parison sections are blow-molded in the individual cavities of the molds automatically by automatic insertion into the cavity of a needle on each mold and retraction therefrom. Pressure fluid is applied to the molds through the needles successively as they move along the closed path for blow-molding hollow articles joined at their necks. A pair of trimming flexible blades are disposed between two successive or next adjacent molds to trim excess material from the mold bottoms. The blades are driven by a piston activating the blades automatically during rotary travel of the molds. The molds each have a fixed half mold and a mobile half mold hinged on the fixed half mold jointly defining a mold cavity for forming hollow articles joined at their necks. Opening and closing of the molds is accomplished by a camming guide path in which are successively received cam followers operating the mobile half molds progressively opening and closing them and an ejector in each mold is actuated for ejecting the molded articles. Each control operation is executed cyclically as the molds are moved continuously along the closed path.

This invention relates generally to blow-molding and more particularly to rotary apparatus for molding hollow plastic articles using blow-molding techniques.

A principal object of the invention is to provide blow-molding apparatus having a high productivity while reducing to a minimum losses of plastic material.

Another object of the invention is to provide mechanism producing hollow articles the bottoms of which have been trimmed.

A third object of the invention is provision of rotary apparatus fed by an extrusion machine feeding out a continuous parison, horizontal or oblique and, consequently, thereby preventing resort to extruders provided with a cross-head which are often troublesome more particularly when the plastic material used in making the blow-molded articles is sensitive to heat.

The rotary blow-molding apparatus for molding hollow plastic articles using blow-molding techniques in accordance with the invention comprises a fixed structure supporting a rotary shaft driven at a constant speed to which are secured a series of joined fixed half molds having cavities reproducing the shape of two hollow half articles joined by the neck. A series of mobile half molds cooperate with the fixed half molds and are secured to the unfixed half molds by a hinge mechanism which is progressively operated by a fixed cam. Means are provided automatically locking the molds in a closed position, other means automatically introduce a fluid under pressure in successive portions of parison enclosed in the molds. The excess material is removed by a device operating on two successive molds. Each mold is provided with an ejector which temporarily joins each hollow molded article with the half mold on which it is mounted, during the opening of the molds.

The rotary shaft on which the molds are fixed is continuously driven at a speed such that the peripheral speed of the mold is equal to the extrusion speed of the continuous parison, It is, however, possible to rotate the shaft at a speed such that the peripheral speed of the mold is slightly higher than the extrusion speed of the continuously extruded parison. In this manner, the extruded parison undergoes a longitudinal stretching and the combination of this longitudinal stretching with transverse stretching caused by later blowing of the parison permits obtaining a hollow article which is oriented in both directions and has improved mechanical resistance.

The means for introducing the fluid under pressure in the successive portions of parison enclosed in the molds comprise retractable hollow needles which puncture laterally the portions of parison in the neck portion which is common to two hollow articles. The excess material formed between two successive molds during the molding operation is removed, preferably, by two integrally joined flexible blades each of which bears on the bottom of a mold and both of which are maintained in rest position by a return spring. The periodic displacement of the blades to effect the desired trimming of material may, for example, be achieved by a fixed piston mounted on the structure of the apparatus and controlled by a cam-operated control system.

To accelerate the hardening of the excess material before removing it, it may be cooled by means of a cold fluid. The cooling may be effected, for example, by means of a pipe fed by the fluid of the auxiliary mechanisms of the apparatus.

The closing and opening of each of the molds is carried out gradually or progressively by means of a system consisting of a small rod having two toggle joints and of a roller mounted in such a way that, when the molds are closed or opened by the roller engaging a fixed cam guide path, the roller is displaced only in a plane perpendicular to the rotary shaft of the apparatus.

Ejectors, mounted on the half molds, and maintained in a rest position by return springs, have at their base a recess. When the portion of the parison enclosed in a mold is blown, plastic material flows into this recess and so causes a temporary joint between the hollow molded article and the half mold on which the ejector is mounted. At the time of opening the mold, this ensures that the molded article remains attached to the half mold provided with the ejector until it is ejected.

The means for locking the molds in closed position comprise a system of levers on each mold secured to the fixed half mold. The locking of the molds is provided by the contact of one of the levers of the locking system with a fixed abutment which is arranged to retract itself when, for any reason, the mold cannot be closed completely. A sudden blocking of the apparatus is then prevented in case of defective operation of a mold. The unclocking of the molds is provided in the same way by the contact of a second lever of the locking system with a second fixed abutment which is non-retractable.

In the apparatus according to the invention, the progressive closure of the molds and their upholding in closed position during the blowing and cooling operations do not necessitate high mechanical forces or suddenly applied forces. Consequently, the risk of breaking the molds is eliminated and their working life is extended.

Other features and advantages of rotary apparatus for the molding of hollow plastic articles using blow-molding techniques in accordance with the invention will be better understood as described in the following specification and appended claims in conjunction with the drawings in which:

Figure 1:
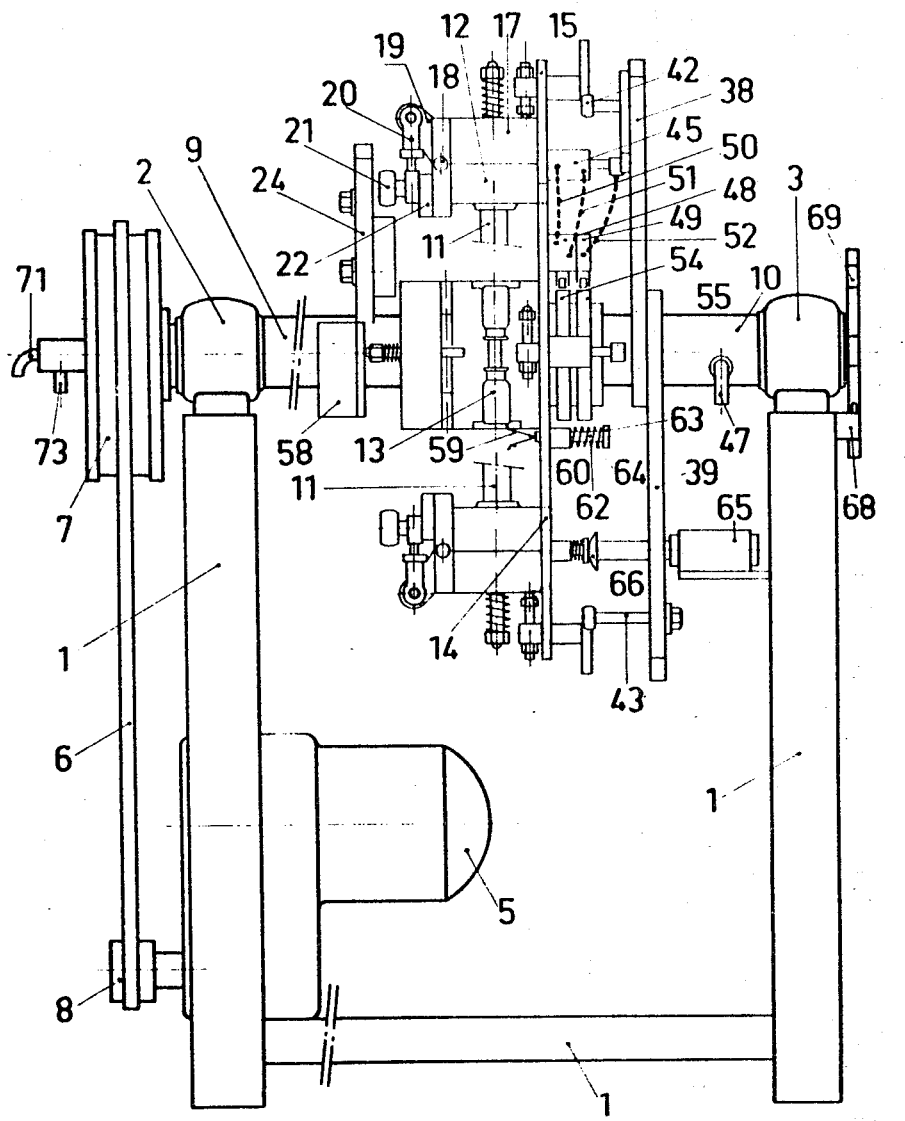
FIG. 1 is a front elevation view of apparatus, in accordance with the invention, taken from the side of the apparatus feeding out a parison.

To facilitate the comprehension of the description of the apparatus and of its operation, all of the elements of the apparatus have not been shown in each figure of the drawings. For example, only four of the eight blowing units have been shown in FIG. 1.

DESCRIPTION OF THE APPARATUS

Referring to FIGS. 1 to 4, a rotary apparatus in accordance with the invention comprises a fixed structure 1 consisting of upright C-shaped standards supporting bearings 2, 3 in which may rotate a hollow shaft 4. The shaft 4 is driven at a constant speed by a motor 5 through a drive belt 6 and pullys 7, 8 and rotates in fixed hollow or tubular members 9, 10. On the rotary shaft 4 are mounted a series of eight radial arms 11 each of which supports a fixed half mold 12 whose mold cavity 13 reproduces the shape of two hollow half articles joined by their necks. The fixed half molds 12 are mounted on the radial arms 11 in such a way that their edges are joined. The fixed half molds 12 support an annular disc 14 on which are secured radial plates 15, 16. With each fixed half mold 12 is associated a complementary mobile half mold 17 which is articulated on the fixed half mold 12 by means of a hinge 18.

Figure 4:
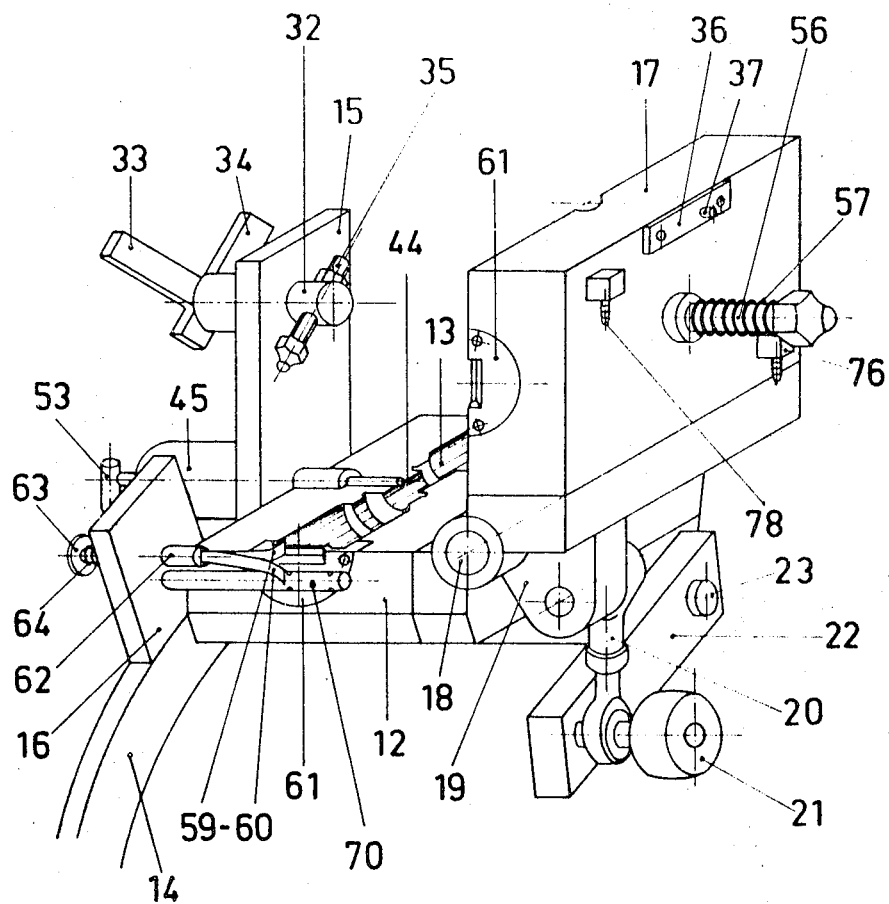
FIG. 4 is a perspective view of a complete mold.

As illustrated in FIG. 4, each mobile half mold 17 comprises a shoulder or bars 19 on which is mounted a small rod 20 having two toggle joints and connected to a roller 21 which is mounted on a mobile plate 22 arranged to pivot around a pivot point 23 of the fixed half mold. Two fixed radial arms 24 and 25 (FIG. 3) mounted on the fixed member 9 and provided with slots 26, 27 permit securing and regulation, by means of bolts 28, of a cam guide path 29, formed by two suitably profiled members 30, 31, in which may be guided or slide the above-mentioned cam-follower or roller 21.

The locking of each of the molds in closed position, during the blowing of the hollow article and its cooling, is ensured by similar mechanisms each including a pivoting shaft 32 (FIG. 4) mounted on radial plates 15. The shaft 32 comprises at one of its extremities a square having two levers 33, 34 arranged at ninety degrees and, at its other extremity, a locking abutment 35. This abutment bears, upon closing of the respective mold, against a plate 36 mounted on the mobile half mold and provided with an end of path abutment 37. The locking device is completed by two fixed radial arms 38, 39 mounted on the fixed hollow member 10 mounted on the support 1. The fixed radial arm 38, which causes the locking of the successive molds in closed position, supports a pivoting lever 40 having one extremity connected by means of a calibrated return spring 41 to the base of the radial arm 38 and whose other extremity comprises a fixed abutment 42 (FIG. 1). The fixed radial arm 39, which causes the unlocking of the molds just before their opening, comprises solely a fixed abutment 43.

The injection of the fluid for manufacturing the hollow articles using a blow-molding process is ensured in each mold by a mobile hollow needle 44 controlled by a double effect piston 45. Each mold is similarly provided with a needle and control piston.

Before proceeding with the description of the blow-molding apparatus, it must be mentioned that the rotary apparatus comprises two circuits fed with compressed fluid. The first circuit, fed with compressed fluid containing lubricating oil in suspension and hereinafter called "oiled fluid," operates the various auxiliary mechanisms of the apparatus which will be disclosed later. The second circuit, fed with dry fluid hereinafter called "blowing fluid" ensures the forming of the hollow articles by the process of blow-molding in the molds. The two fluids are distributed respectively to control gates 48, 49 secured to the hollow shaft 4 through a double rotary joint mounted on the shaft through flexible tubes (not shown) and through diametrically opposed adapters 47 located on the fixed hollow member 10.

Figure 2:
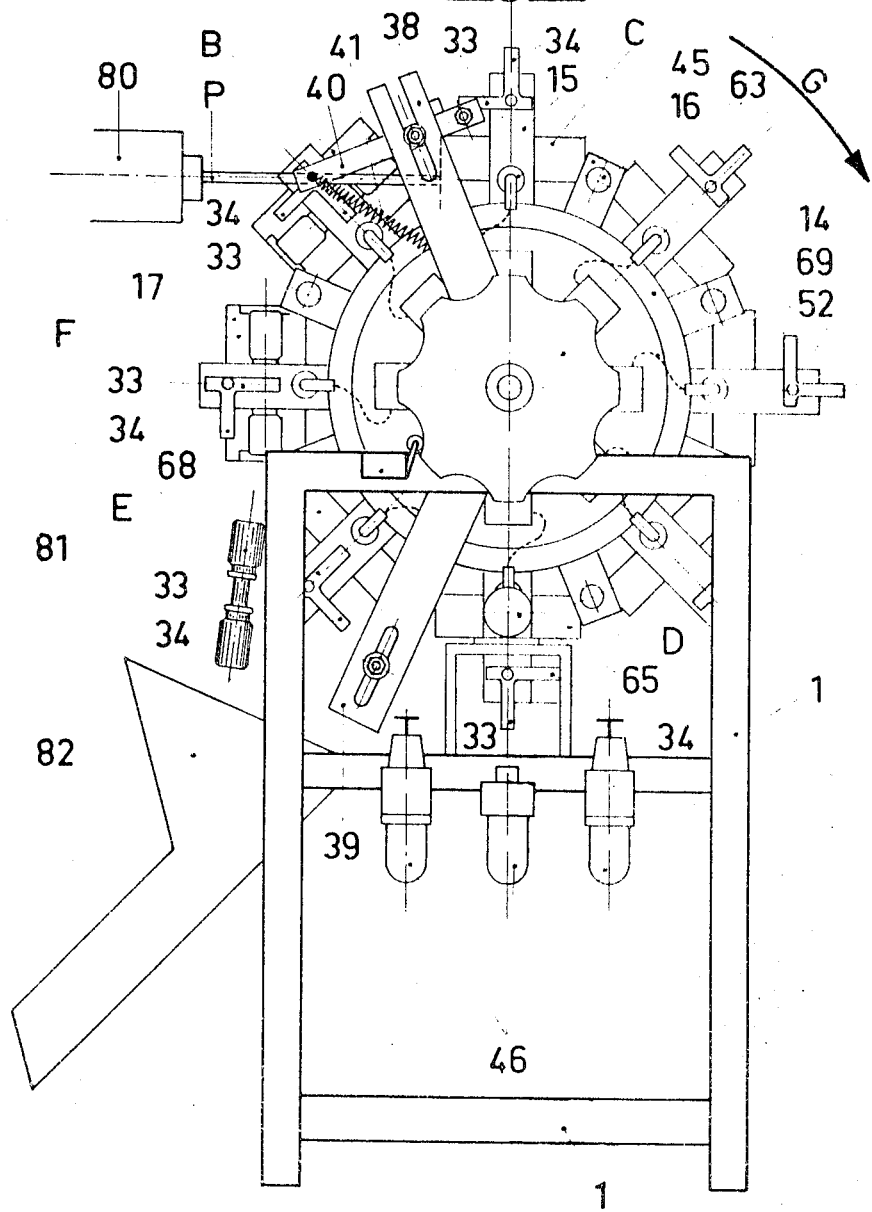
FIG. 2 is a side elevation view from the right side of the apparatus of FIG. 1.
Figure 3:
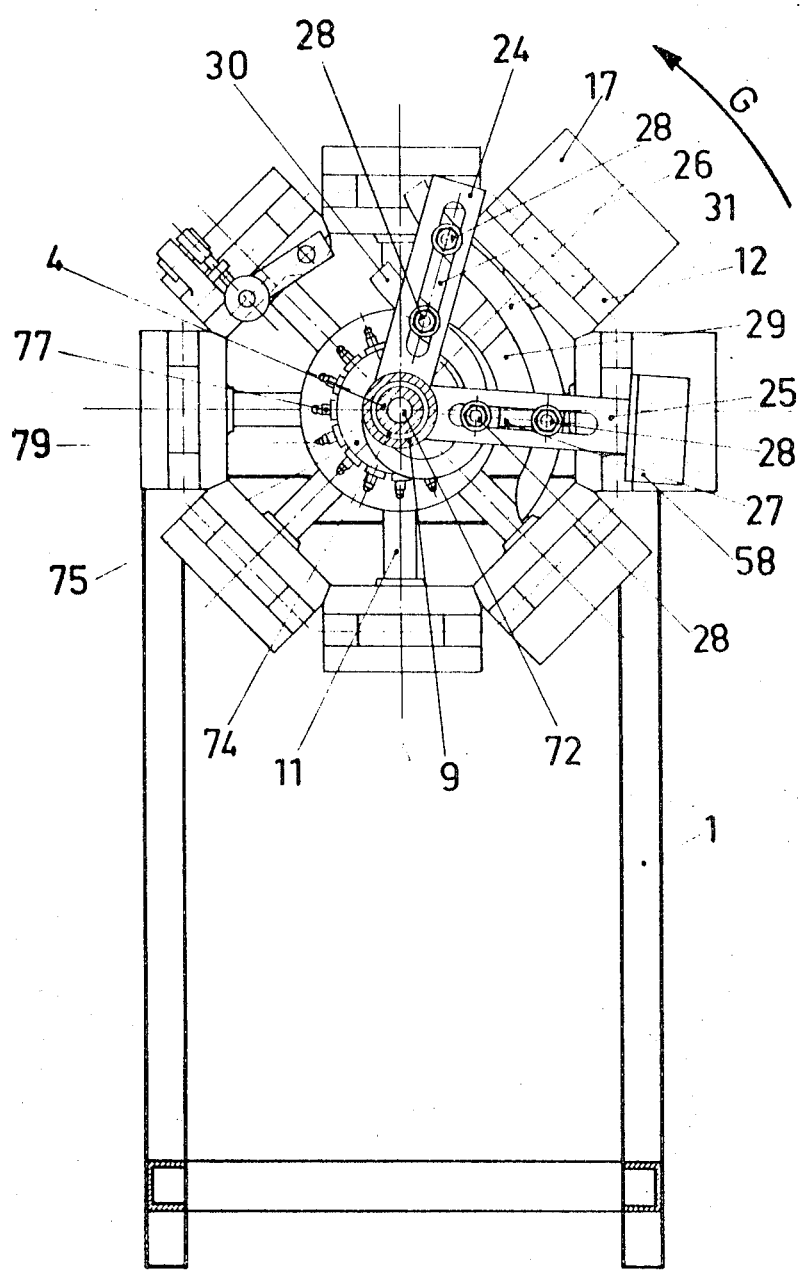
FIG. 3 is a side elevation view from the left side of the apparatus taken along line A–A′ of FIG. 1.

These fluids first flow through filters and eventually through an oiler shown at 46 and mounted on the fixed structure 1 of the apparatus (FIG. 2). Each mold is equipped with two control gates 48, 49 which follow its movement of rotation. The gate 48 which is fed with oiled fluid operates through flexible tubes 50, 51 on the double effect cylinder 45 controlling the insertion and withdrawal of the blowing needle 44 while the other gate 49 feeds the blowing fluid in the blowing needle 44 through flexible tubes 52 and an adapter 53. The double effect cylinders 45 are mounted on radial plate 15 and follow the fixed half molds 12 in their movement of rotation. The control gates 48, 49 are operated by fixed cams 54 and 55 which are adequately profiled and mounted on fixed hollow member 10.

Each mobile half mold 17 comprises an ejector 56 (FIG. 4) normally maintained in rest position by a calibrated spring 57. Ejector 56, when inserted in the mold, protrudes in the cavity of the mobile half mold at the neck which is common to two hollow molded articles. In rest position, the ejector 56 further provides a recess (not shown) at the level of the cavity in the half mold. In other words, in rest position, the extremity of ejector 56 does not reach the cavity of the half mold but is slightly retracted with regards thereof. The ejection device is completed by a fixed control cam 58 (FIG. 1) mounted on the left side fixed hollow member 9.

The apparatus further comprises devices for automatic trimming of each of the bottoms of the molded articles. These devices each comprise two flexible blades 59, 60 which bear against an inlaid plate 51 mounted on the adjacent extremities of two consecutive molds. These two blades are mounted on a rod 62 which is movable axially through radial plates 16. The movable rod 62 comprises an abutment 63 and is maintained in rest position by a return spring 64. The trimming devices are completed by a double effect cylinder 5 mounted on fixed structure 1 of the molding apparatus and controlled by a push rod 66. The feeding of oiled fluid to the double effect cylinder 65 is ensured by a fixed gate 68 mounted on structure 1, fed by the oiled fluid circuit and controlled by a rotary circular cam 69 having a suitable profile and being mounted on the extremity of rotary shaft 4.

To facilitate the trimming, the plastic material between two consecutive molds is first cooled by cooling fluid in pipes 70 fed by connections (not shown) on the flexible tubes (also not shown) which feed the blowing control gates 48.

The molding apparatus is finally completed by a device for feeding a cooling fluid to the mold. This device consists of an adapter 71 in communication with the hollow portion 72 of hollow shaft 4 and an adapter 73 in communication with an annular space 74 between hollow shaft 4 and the fixed hollow member 9. This device comprises, in addition, a distributor 75 (FIG. 3) which distributes through adapters 76 and 77 and flexible tubes (not shown) the cooling fluid to the various fixed and mobile half molds and ensures the discharge of the cooling fluid through other adapters 78 and 79 and flexible tubes, not shown. Preferably, the cooling fluid is introduced in the molds through annular space 74 and is withdrawn through hollow portion 72 of the hollow shart 4.

OPERATION OF THE APPARATUS

For the description of the operation of the apparatus, reference is made to successive positions B, C, D, E and F occupied successively by a mold in FIG. 2 during the rotation of the drive shaft 4, and of the elements which are associated with it in a clockwise direction as indicated by an arrow G. Furthermore, it is assumed that the apparatus is in operation and that all the necessary adjustments have been made. All of the operations described as to one mold as later described take place as to each mold successively.

When the mold is in a position B, its roller 21 is engaged in the guide path 29 and is in open position. During its movement towards the next position C, the fixed half mold receives a portion of the continuous parison P fed horizontally by an extrusion head 80 fragmentarily shown and, simultaneously, the guide path 29 causes the progressive displacement of the roller 21 upwardly with respect to the fixed half mold 12 and consequently the progressive closing of the mold.

When the mold reaches the position C, it is completely closed and its opening and closing control roller 21 leaves the guide path 29. Because of small rod 20 having two toggle joints the roller 21 may follow a trajectory located entirely in a plane perpendicular to the hollow drive shaft 4 during the pivoting movement of the mobile half mold and, consequently, the guide path 29 may be located in a plane.

Simultaneously, lever 33, which was until then in a radial position, meets the fixed abutment 42 which causes its rotation in a clockwise direction towards a position which is tangential to the trajectory followed by its axis 32. This rotation causes the application of the locking abutment 35 against the abutment 37 of the mold plate 36 on the mobile half mold and, consequently, the locking of the mold in a closed position.

If for any reason, such as, for example, a defective positioning of the parison portion P in the mold has taken place, the mold is unable to close completely the force opposed to the locking of the mold exceeds the strength of the return spring 41 and the fixed abutment 42 is retracted so as to prevent blocking of the apparatus and the eventual breakage of certain parts of the machine.

When the mold leaves the second position C, the fixed blowing control cam 54 operates the mobile blowing control gate 48. The latter feeds the double effect piston 45 with a fluid under pressure through the flexible tube 51, and the hollow needle 44 is inserted in the parison portion P. Then the fixed blowing control cam 55 operates the mobile blowing control gate 49. The latter, in turn, feeds the hollow needle 44 with a fluid under pressure through the flexible tube 52 and the parison P takes the shape of the cavity of the mold.

During this blowing operation, a portion of the parison flows in the recess of the ejector 56 and ensures a temporary connection of the molded hollow article with the mobile half mold 17. Furthermore, the cooling of the parison portions located on each side of the mold is ensured by the fluid distributed by the pipes 70.

During the movement along the trajectory of the mold between positions C and D, the hollow needle 44 is fed with fluid under pressure and the cooling fluid flowing through the half molds ensures the cooling of the hollow articles thus formed. When the mold approaches positions D, the blowing control cam 55 reoperates blowing control gate 49 which cuts off the feed of fluid under pressure to the hollow needle 44. Then the blowing control cam 54 re-operates, in turn, the blowing control gate 48 which, from there on, feeds the double effect piston 45 with a fluid under pressure through flexible tube 50 which causes the withdrawal of the blowing needle 44.

When the mold approaches positions D and when radial plate 16 precedes it is facing the double effect cylinder 65, the circular cam 69 operates the fixed gate 68 which feeds the double effect cylinder 65 and causes the actuation of push rod 66. The latter hits abutment 63 and causes the displacement of the flexible blades 59, 60 which ensure the trimming of adjacent bottoms of the hollow articles of this mold and in the preceding mold. When plate 16 moves away from this position, abutment 63 leaves push rod 66 and the latter returns to its rest position under the action of the circular cam 69 and the fixed gate 68. At the same moment the return spring 64 returns the flexible trimming blades 59, 60 to their initial position.

When the mold leaves position D and when radial plate 16 which follows it is facing the double effect cylinder 65, the same sequence is repeated. Consequently, the hollow article in the mold is trimmed at both ends. Then, lever 34 meets fixed abutment 43 which causes its rotation in a counterclockwise direction and the return of the lever 33 in a radial position. The rotation of the two levers 33, 34 causes the pivoting of the abutment 35 and consequently the unlocking of the mold.

At this moment the guided roller 21 engages guide path 29 which causes the progressive displacement, in a downward direction (FIG. 4) of the roller 21. From there on, the mold open progressively. The molded hollow article remains attached to the mobile half mold 17 because a portion thereof is caught in the recess formed at the base portion of ejector 56.

During the progressive opening of the mold the ejector 56, mounted on the mobile half mold, meets the fixed cam 58 which causes the progressive insertion of the ejector 56 in the mold. When the mold reaches the position F, the ejector protrudes through the cavity of the mold and the hollow body is consequently ejected from the mobile half mold and falls in a funnel receptacle 82.

As soon as the mold passes beyond the ejection position F the ejector 56 leaves the fixed cam 58 and its spring 57 brings it back to its rest position. The mold is then ready to receive a new parison portion and to begin a new molding cycle.

Figure 5:
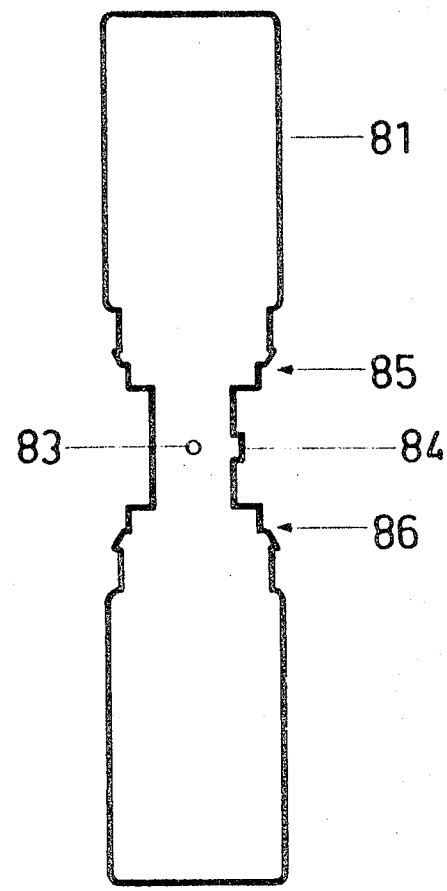
FIG. 5 is a cross-section view of a hollow article made with the apparatus in accordance with the invention.

In using a mold having a cavity such as shown in FIG. 4, there is obtained a hollow molded article 81 such as shown in FIG. 5. In this figure, there is shown a perforation 83 left by the blowing needle and a protuberance 84 formed by the insertion of a portion of the parison in the recess at the base of the ejector 56. As it has been disclosed previously, this protuberance ensures the temporary connection of the hollow molded article with the mobile half mold at the opening of the mold and permits the unloading or ejector of the hollow molded article at a predetermined fixed point of the trajectory or closed path followed by the molds.

It is only necessary later on to cut the hollow article 80 where indicated by the arrows 85 and 86 to obtain two complete articles which are completely trimmed. This last operation may be done automatically using an apparatus such as disclosed in Belgian Pat. No. 673,913 but equipped with two cutting blades.

The apparatus disclosed may be modified in various ways without departing from the scope of the invention. For example, it is obvious that the control of the blowing needle may be realized mechanically by means of fixed cams, that the ejectors may be mounted on the fixed half molds and that the movement of the ejectors may, in such case, be controlled by the pivoting of the mobile plates 22, that the radial arms 11 may be replaced by a circular disc, etc.

Finally, it is possible to use molds having two parallel molding cavities fed by a double extrusion head. In this case, two blowing needles may be used for each mold or a single needle having lateral openings. In such a way, four hollow articles may be molded at once.

The apparatus in accordance with the invention offers various advantages as follows:

It permits a high productivity ranging about 10,000 containers per hour;

Its completely automated operation does not necessitate supervision by highly skilled labor;

The arrangement of the successive fixed half molds which are practically joined permits reduction of the loss of plastic material to a minimum;

The progressive closing of the molds ensures an extended life thereof;

The regulation of the speed of rotation of the molds permits occasionally a longitudinal stretching of the parisons in the molds and consequently, the production of hollow articles having improved mechanical characteristics;

The use of telescopic radial arms and of a circular disc equipped with radial slots permits quick removal of the molds for the production of containers of various sizes and forms.

While a preferred embodiment of the invention has been shown and described, it will be understood that many modifications and changes can be made within the true spirit and scope of the invention.

What I claim and desire to secure by Letters Patent is:

1. A rotary apparatus for blow-molding hollow plastic articles used with an extruder feeding a continuous parison thereto comprising;
   (a) a plurality of molds each having two joined half molds defining a mold cavity therebetween corresponding to the shape of two hollow articles joined at their necks,
   (b) each mold comprising a fixed half mold and a mobile half mold operable to positions opening and closing the respective mold,
   (c) means mounting the molds for rotation along a rotary path for receiving in each successive mold a parison while the mold is in an open condition and enclose a portion of the parison when closed,
   (d) means operating the mobile mold halves successively to an open and a closed condition during rotary movement of the molds,
   (e) means automatically, releasably locking the individual molds comprising for each mold a lever system secured to a respective fixed half mold, and means automatically operating the lever system to a locking position when the half molds are in a closed condition and automatically operating the lever system to a condition in which the mold is unlocked,
   (f) means introducing a pressure fluid automatically into the parison portions successively for blow-molding of the articles enclosed in the successive molds,
   (g) trimming means automatically operable during rotation of said molds removing the excess parison material from between two successive molds, and
   (h) ejector means for each mold holding the mold articles in said mold while said molds are in an open condition and driven along the rotary path and ejecting the mold articles.

2. A rotary apparatus for blow-molding hollow plastic articles according to claim 1, in which said means mounting the molds for movement along said rotary path comprises a rotary driven shaft moving said molds along said path at least equal to the speed of extrusion of the continuous parison.

3. A rotary apparatus for blow-molding hollow plastic articles according to claim 1, in which said means mounting said molds for movement along said rotary path comprises a shaft driven rotationally at a constant speed moving said molds along said path at a constant speed in timed relationship with the extrusion of the continuous parison.

4. A rotary apparatus for blow-molding hollow articles according to claim 1, in which said means introducing pressure fluid automatically into the parison portions in the molds comprises, for each mold a needle automatically insertable into the cavity of the mold and retractable therefrom, means inserting and retracting the needle in each mold successively during travel of the molds along said path, and means to apply automatically the pressure fluid to the needle during travel of the molds along said path.

5. A rotary apparatus for blow-molding hollow articles according to claim 1, in which said trimming means comprises two flexible blades for pairs of next adjacent molds, means mounting the blades for removing excess material of said parison sections at the bottom of the molds.

6. A rotary apparatus for blow-molding hollow articles according to claim 5, in which said trimming means comprises means operating said flexible blades comprising for each of said two blades an operating piston, cam control means controlling said piston, and a return spring to restore the blades to a rest position.

7. A rotary apparatus for blow-molding hollow articles according to claim 6, including means to cool excess material of said parison before trimming and removal thereof.

8. A rotary apparatus for blow-molding hollow plastic articles according to claim 1, including means opening and closing the molds progressively, automatically comprising an operating member connected to each mobile mold half, a cam follower on said operating member, and a means defining a camming guide path along which said cam follower is guided for progressively removing said mobile mold half for opening and closing a respective mold.

9. A rotary apparatus for blow-molding hollow plastic articles according to claim 8, in which said means defining said camming guide path is common to all of said molds.

10. A rotary apparatus for blow-molding hollow plastic articles according to claim 1, in which means operating the lever system comprises means effective to lock and unlock the individual molds during travel of said molds along said path, and each lever system comprising a lever having two arms at an angle relative to each other, and a common pivot for said arms.

11. Apparatus for molding hollow plastic articles from a continuously extruded parison comprising, a plurality of molds operable to an open condition and a closed condition, means driving the molds continuously in a closed path of travel in succession, the path of travel of said molds in part corresponding to a path along which said parison is extruded, means for automatically cyclically opening the molds successively to successively receive therein individual sections of said parison and closing the mold cyclically with the respective individual sections of the parison contained therein, locking means on each mold automatically operable successively on the molds releasably locking the respective molds and unlocking the molds, means operating the locking means successively during travel of said molds along said closed path, said molds each having a mold cavity, means operating automatically to apply fluid pressure internally of the individual sections of parison in the individual molds successively to mold the parison sections in the molds into blow-molded articles corresponding in configuration to the corresponding mold cavity, trimming means operating automatically to remove excess parison material from between the molds and trimming bottoms of the articles formed in said molds during the travel of said molds along a certain length of said closed path, ejector means in each mold operated automatically along the path of travel of said molds successively to eject the articles from the molds when in an open condition along length of said path of travel, means operable during the travel of said molds along said path actuating said ejector means, and said ejector comprising means operable to a position defining jointly with said mold a recess in communication with said cavity receiving therein plastic material of said parison to form a protuberance on a plastic article molded in an individual mold effective to hold the article in a mold before ejection thereof while said mold is open.

12. Apparatus for molding hollow articles according to claim 11, in which said path of travel of said molds lies in a vertical plane.

13. Apparatus for molding hollow articles according to claim 11, in which said means driving the molds along said path comprises means moving the molds along said path at a speed corresponding to the extrusion rate of said parison.

14. Apparatus for molding hollow articles according to claim 11, in which said means driving the molds comprises means moving the molds along said path at a speed greater than the rate of extrusion of said parison, whereby the plastic in said parison sections is oriented longitudinally of the parison.

References Cited

UNITED STATES PATENTS

| 2,330,369 | 9/1943 | Marsh. | |
| 2,349,177 | 5/1944 | Kopitke | 18—5X |
| 3,142,089 | 7/1964 | Nilkalis et al. | 18—5 |
| 3,294,885 | 12/1966 | Cines et al. | 18—5X |
| 3,310,834 | 3/1967 | Simpson et al. | 18—20X |
| 3,473,192 | 10/1969 | Martelli | 18—20X |

J. SPENCER OVERHOLSER, Primary Examiner

M. O. SUTTON, Assistant Examiner

U.S. Cl. XR.

18—20